Jan. 12, 1960 A. S. SANSONETTI 2,921,290
INVENTORY INDICATOR
Filed Sept. 10, 1954 4 Sheets-Sheet 1

INVENTOR
ALFRED S. SANSONETTI
ATTORNEY

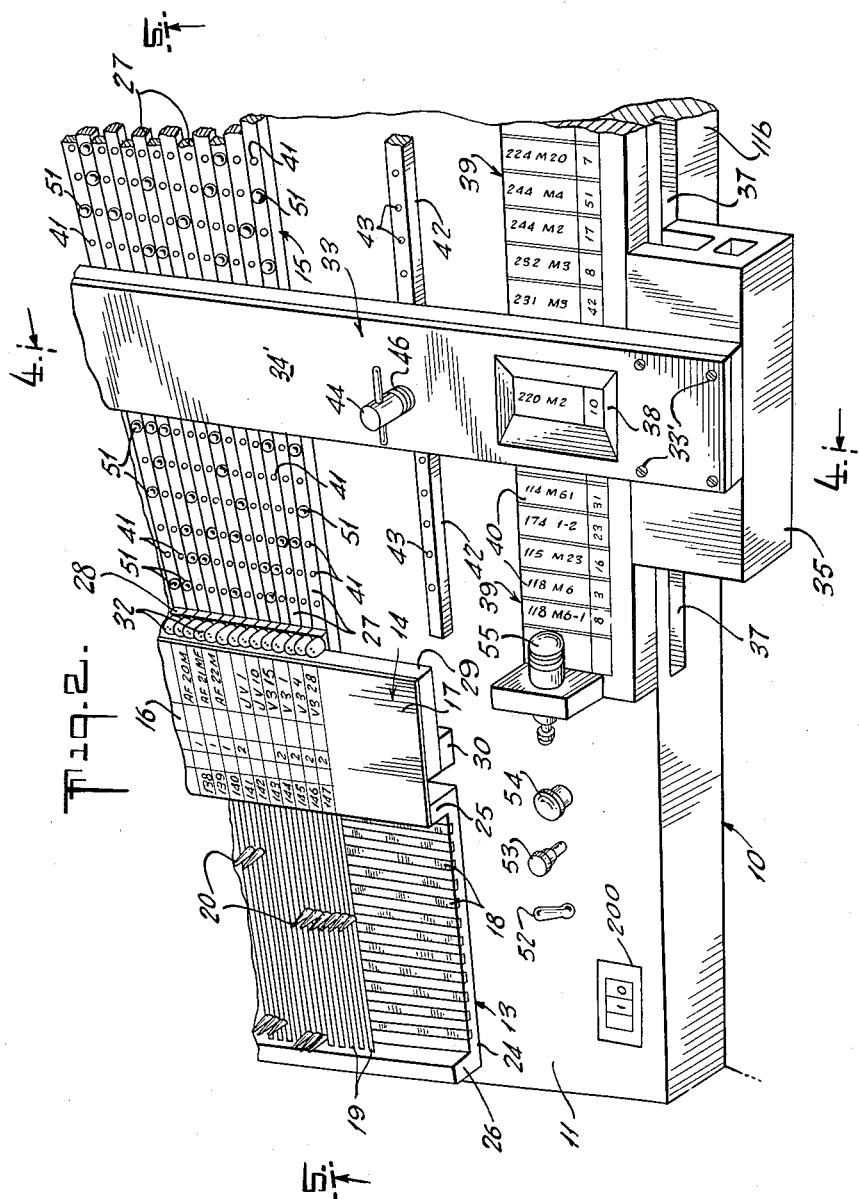

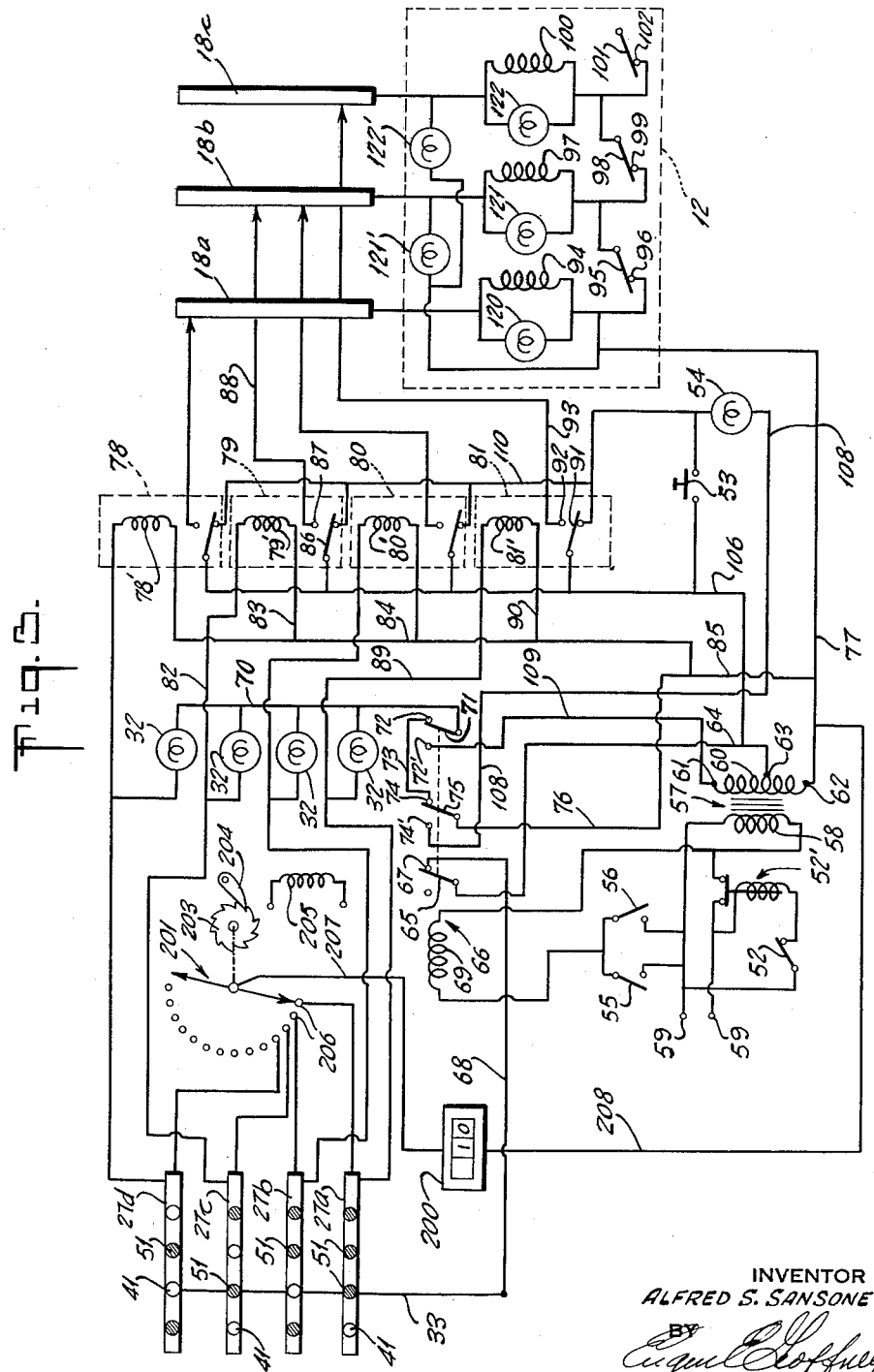

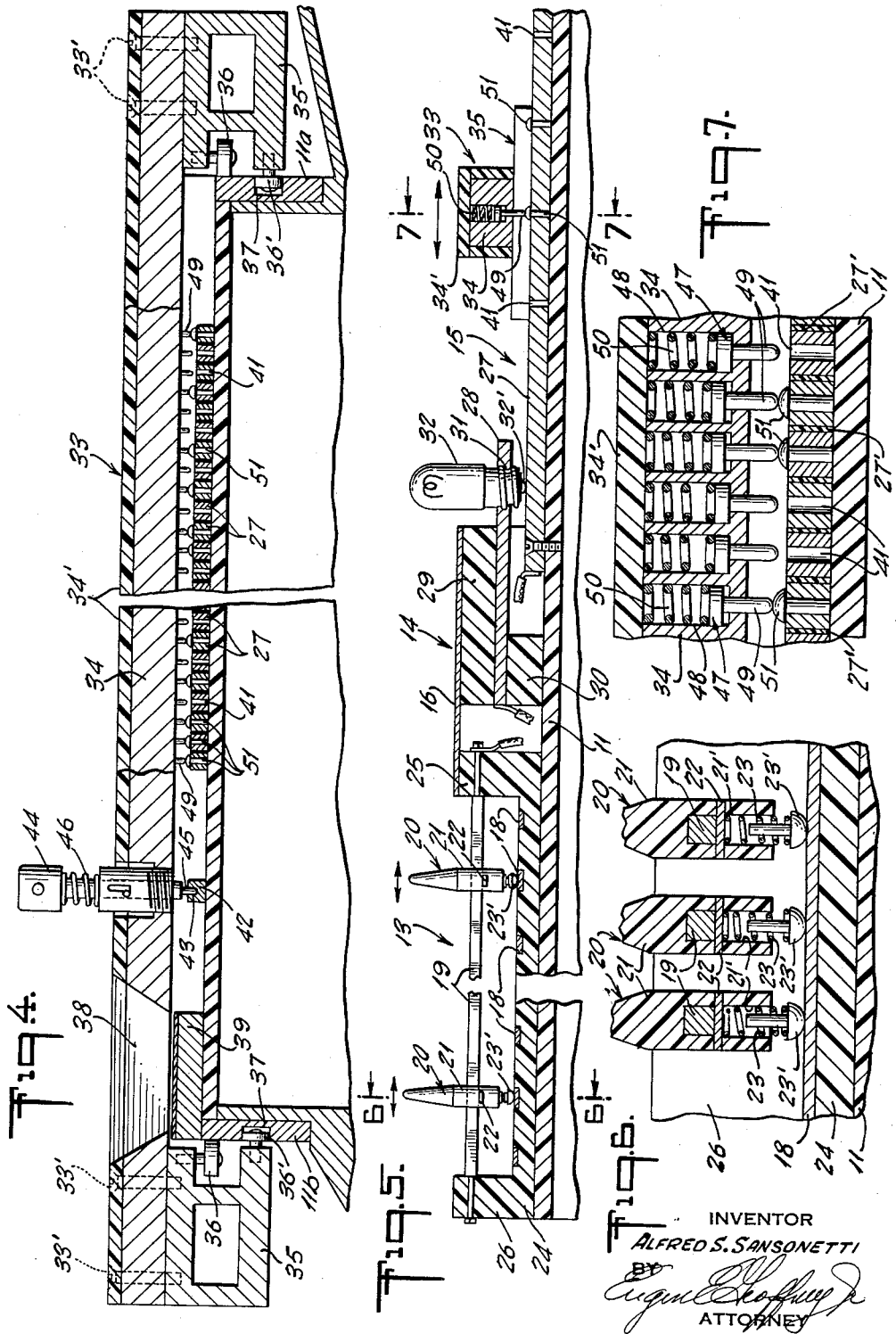

United States Patent Office 2,921,290
Patented Jan. 12, 1960

2,921,290

INVENTORY INDICATOR

Alfred S. Sansonetti, Millington, N.J., assignor to Airborne Accessories Corporation, Hillside, N.J., a corporation of New Jersey Application September 10, 1954, Serial No. 455,318

7 Claims. (Cl. 340—153)

This invention relates to computing devices and more specifically to stock control apparatus for determining the quantity of a given item or piece of equipment that can be produced with an existing stock of component parts. While the invention is particularly intended for stock control, it will become apparent however that it is generally useful for other related applications.

Inventory control in the manufacture of different items of equipment presents the continuing problem of determining the quantity of any given item of equipment that can be made with the existing stock of component parts. In instances where the different items all use different parts, it is a relatively simple matter to maintain a close record of the quantity of such items that can be fabricated with available stock. However, in most instances many of the items manufactured by one company will normally utilize some parts common to at least certain of the other items as well as parts prepared specifically for that item. In these cases, inventory control involves a rather complicated accounting procedure that does not provide the ready answers required in the normal conduct of business. While systems have been proposed for meeting certain aspects of these problems, they have not provided an entirely satisfactory solution and necessitate the use of relatively large, expensive apparatus requiring skilled operators. Moreover as many of these prior systems involve several separate and time consuming steps, they do not provide an effective solution for stock control in many instances.

Accordingly this invention has as an object the provision of apparatus overcoming the foregoing disadvantages of prior systems and at the same time providing a simplified, dependable and low cost device useful in both large and small industries. These ends are attained through the utilization of means for storing information pertaining to stock balances and the composition of items of manufacture together with means for correlating this stored information to provide a substantially instantaneous computation of the quantity of a given item that can be fabricated with the stock balance of the required component parts.

Another object of the invention resides in the provision of an improved calculator for inventory control that is adaptable to all phases of industrial stock control and includes means for rapidly checking the operation thereof to insure the accuracy of the computations.

Still another object of the invention is the provision of stock control apparatus that not only provides an instantaneous determination of the quantity of a given piece of equipment that may be fabricated from existing stock balances but also indicates the particular parts or components needed for such fabrication.

Still another object of the invention is a new and improved stock control computer that is easy to operate and maintain and that may be quickly transferred from one manufacturing operation to another without modification of the apparatus itself.

The above and other objects and advantages of the invention will become more apparent from the following description and drawings forming part of this application.

In the drawings:

Fig. 2 is an enlarged view of a section of the apparatus shown in Fig. 1;

Fig. 3 is a circuit diagram of the invention;

Figure 1:
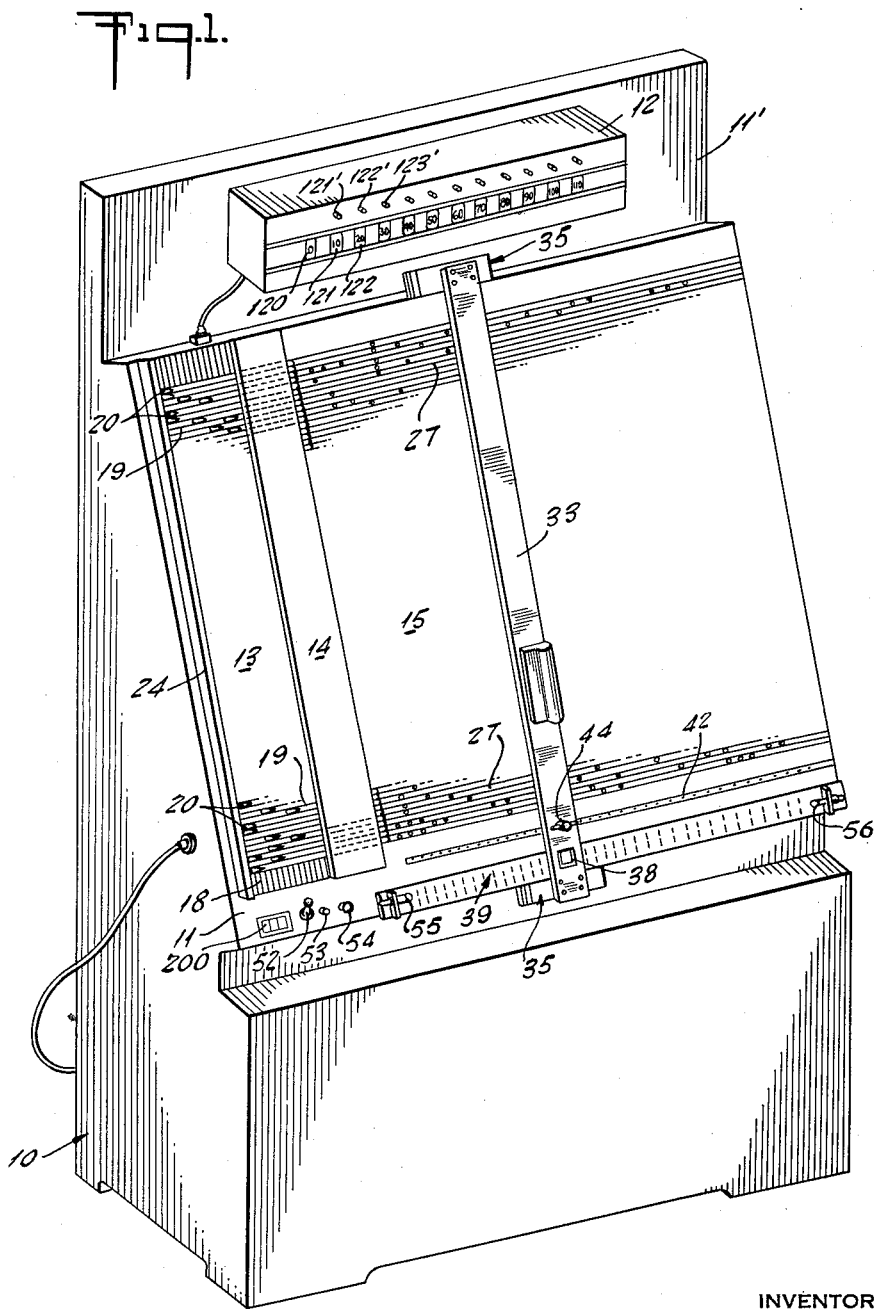
Fig. 1 is a perspective view of one embodiment of the invention.

Figs. 4 and 5 are cross sectional views of Fig. 2 taken along the lines 4—4 and 5—5 thereof, respectively; and Figs. 6 and 7 are cross sectional views taken along the lines 6—6 and 7—7 of Fig. 5, respectively.

Broadly the invention comprises means for storing information pertaining to the quantity of each different part in existing stock and parts lists for each item of manufacture. This information is fed into the apparatus in a manner that provides for ready correlation and automatic indication of the quantity of any given item that may be assembled with available parts. The advantages of the invention become quite apparent in cases wherein certain parts are common to all items of equipment, others are common to only some of the items and still others are individual to specific items. Thus as orders are received for the fabrication or assembly of different items of equipment, the possibility of completing such orders from existing stocks can be determined in a matter of minutes. Therefore as each order is approved for manufacture, the stock record on the apparatus can be appropriately and quickly modified so that a constant check can be maintained on stock balances and customers can be provided immediately with firm commitments on orders.

Reference is now made to the drawings and more specifically to Figs. 1, 2 and 4 through 7 which illustrate one embodiment of apparatus in accordance with the invention. While the invention may be arranged in any convenient form, the illustrated embodiment is housed in a cabinet 10 having a sloping front panel 11 carrying the storage means for introducing the desired information and an upwardly extending panel 11' having an indicator 12 thereon for providing a visual indication of the answer to a specific computation.

The apparatus disposed on the front panel 11 is divided generally into three separate sections 13, 14 and 15. The section 14 is a fixed member having a plurality of uniformly divided spaces 16 extending transversely thereof for receiving stock information such as the stock numbers of individual parts and the quantity of each part on hand, the number of such part required for each item, and any other required information. Since the stock numbers as well as the quantities may be frequently changed, it is preferable to cover the surface of this strip 14 with a suitable material 17 such as plastic or the like having a mat finish.

To the left of the strip 14 is a relatively narrow section or stock control panel 13 having a plurality of vertically disposed parallel metal strips 18 insulated one from the other. Overlying these metal strips 18 are a plurality of transverse metal bars 19 insulated one from the other and aligned with the transverse spaces 16 on the central strip 14. The bars 19 carry sliding contactors 20 which operate to electrically interconnect each associated bar 19 with one of the vertically disposed strips 18 and provide for an electrical indication of the number of each part in stock. In cases for instance where two identical parts are used in the fabrication of one item then the contactor 20 is positioned to show a numerical figure equal to one half the actual stock balance. While these slidable connectors may assume any desired form, they preferably comprise a body 21 of insulating material having an opening for receiving a bar 19. The lower side of this opening is formed by a narrow metal strip 22 effecting an electrical contact with the bar 19. The underside of the body 21 has an opening 21' therein for receiving a spring 23 carrying a contactor 23'. The spring urges the metal strip 22 upwardly against the under side of the bar 19 and the contact 23' downwardly against the conductive strips or members 18 as the entire contactor 20 is moved transversely of the members 18. Thus each contacting means 20 may be individually moved along its associated bar 19 and into contact with any desired bar 18. In order to facilitate the adjustment of these contactors, the bars 18 are preferably embedded in the base of the U-shaped member 24 which is formed of an insulating material. The member 24 may be secured to the panel 11 by any suitable means and may include means in the form of the outwardly extending legs 25 and 26 for supporting the plurality of lateral bars 19 carrying the movable contactors 20. In the particular illustration, the leg 25 also supports one edge of the panel 14 carrying the stock list as previously described.

To the right of fixed panel 14 is the program panel 15 which constitutes a plurality of horizontally disposed bars 27 of conductive material. The successive bars are insulated one from the other by strips of insulating material 27' and extend from the right hand edge of the front panel 11 to a point underlying the central stock list panel 14 as may be observed in Fig. 5. The bars are spaced to provide a single bar for each of the stock parts listed in the spaces 16 on the panel 14. Thus there is provided for each of the several stock items listed on the panel 14 a stock control bar 19 and an associated contactor 20 and one transverse bar 27. While in this embodiment of the invention these three items are in alignment one with the other across the panel 11, it is apparent that any other suitable disposition may be employed.

Overlying the inner end of each parallel bar 27 and individual thereto is a metal bracket 28 which extends on its inner end between a pair of insulated supports 29 and 30 secured by suitable means to the panel 11. The outer end of this bracket 28 has a threaded opening 31 for receiving an indicating lamp 32. The bracket 28 is spaced from its associated bar 27 a distance sufficient to permit the end contactor 32' of the lamp 32 to bear against its bar 27 so that the application of energy between the bar 27 and the lamp supporting member 28 will illuminate the lamp. Thus an individual lamp is provided for each of the several stock items which are listed on the panel 14. The function of these lamps as well as the function of the bars 19 and 27 will be discussed in connection with the circuit diagram shown in Fig. 3 of the drawings.

Associated with the program panel 15 is a vertically disposed selector member 33 mounted for transverse movement of the panel. This selector consists of an elongated strip of conductive material 34 having a relatively thin overlying sheet of insulating material 34'. Each end of the selector 33 carries a trolley member 35 generally of rectangular configuration. These members are each provided with a pair of spaced rollers 36 bearing against the top and bottom edges 11a and 11b of the panel 11. In addition they each include a third roller 36' riding within the grooves 37. Since the rollers 36' are set at 90° with their companion rollers 36 the selector 33 is held firmly in position overlying the program panel 15 with the rollers 36 maintaining proper alignment of the selector as it is moved transversely of the panel 15. If desired, metal inserts may be provided on the walls 11a and 11b to prevent excessive wear by the rollers 36 and 36'.

While the foregoing structure for supporting and moving the selector 33 has been found to attain the desired ends, it is apparent that any suitable selecting means for attaining a similar result would be equally satisfactory. The overlying members 34 and 34' of the selector 33 are secured to the trolleys 35 by means of screws 33' and are provided with a flared opening 38 at the bottom end thereof for coordination with a horizontally disposed panel member 39.

The panel member 39 has a plurality of laterally spaced divisions 40 for recording model numbers of various items of equipment to be manufactured together with the number of parts required for the item. Aligned with these divisions 40 are a plurality of holes 41 in each of the bars 27 forming the program panel so that for the first division 40 on the panel 39 there is a vertical series of openings 41 with one opening formed in each of the bars 27. Thus for any given number of divisions 40 on the panel 39 there will be an equal number of vertical groups of openings 41.

Between the program panel and the item or model panel 39 there is a metal bar 42 having a plurality of openings 43 which are precisely aligned with the vertical sets of openings 41 in the bars 27. The selector or carriage 33 which cooperates with the program panel is provided with an aligning button 44 having a pin 45 on the lower end thereof for engagement with the openings 43 in the bar 42. A spring 46 associated with the button 44 maintains the pin 45 in the raised position and out of engagement with the bar 42. When positioning the selector 33 over a predetermined division 40 on the panel 39 the selector is moved to the approximate position and then the pin 44 is depressed to insure accurate alignment with such division and the associated line of openings 41 in the bars 27.

Cooperation between the selector or carriage 33 and the program panel 15 is accomplished by a plurality of spring loaded contactors 47 slidably mounted within cooperating openings 48 in the carriage member 34. Each contactor has an elongated pin 49 extending downwardly through the bottom side of the member 34 and a spring 50 disposed between the contact 47 and the overlying layer of insulating material 34' to urge the contact in a downward position as shown in Fig. 7. Since these contactors 47 are all mounted within the metallic member 37 they are therefore electrically connected one to the other.

In order to effect cooperation between the selector 33 and the program panel 15 contact members 51 are inserted in predetermined openings 41 in the transverse bars 27. These contacting members 51 have a predetermined height above the surface of the bars 27 so that as the contactors 47 of the selector 33 are moved over the program panel, they will firmly contact the buttons 51. In the absence of the button 51, however, the lower end 49 of the contactors 47 will not contact their associated bars.

This program panel actually constitutes a device for storing information pertaining to the parts required to fabricate a given item of equipment. This information is stored on the program panel by merely inserting contacting numbers 51 in the appropriate openings 41 in bars 27 to indicate the particular parts listed on the panel 14 required for the fabrication of the items listed in the several divisions on the panel 39. Assuming, for instance, the item 118M6–1 noted in the left hand division 40 of the panel 39 is to be assembled and requires 8 parts. This division corresponds with the first vertical set of openings 41 and it will be noted that this item requires the following parts, among others, AF20M, AF21MF, JV–1 and V3–15. When the selector carriage 33 is moved so that the selected position 40 is centered within the opening 38 the several buttons 51 will be contacted by the associated contactors 47 on the selector and thus connect the associated bars 27 together. As will be shown this action illuminates the lamps 32 associated with the interconnected bars 27 and in addition applies energy to certain of the bars 19. Since the bars 19 are connected with predetermined bars 18 by means of the contactors 20, certain of the bars 18 will receive energy supplied at least indirectly by means of the selector 33. These bars are coordinated with suitable relays which in turn actuate the indicator 12 to show the maximum quantity of the selected item that may be fabricated or assembled with available stock parts.

The indicator panel 12 is in the form of an elongated rectangular structure and is provided on its front face with two sets of indicating lamps with one set being designated by the numerals 120, 121 and 122, etc. and carrying the numerals 0, 10, 20, 30, etc., respectively. In the specific embodiment of the invention this set of indicating lamps is disposed behind translucent sheets of plastic, glass, or the like which actually carry the numerical designations corresponding to quantity of items that may be fabricated. The second set of indicating lamps 121', 122' and 123' are disposed immediately above and in alignment with the first set of lamps, with the lamp 121' disposed immediately above the lamp 121, and the lamp 122' immediately above the lamp 122, etc. This second set of lamps is interconnected with the stock control panel 13 to indicate the next part or parts that will limit the total quantity of items that can be manufactured in the event a shortage in the quantity of the first critical part is overcome. For instance, let it be assumed that the light 121 indicates that ten units of a particular item can be fabricated with available parts in stock. This means that one of the parts required to fabricate this unit has a stock balance of only ten. Let it be assumed that another one of the required parts has a stock balance of thirty. In this event the light 123' will also be illuminated to indicate that if the shortage in the controlling part is overcome, then the next quantity of items that can be fabricated will be thirty. In this way a complete picture of the immediate production possibilities of a given item or items is immediately obtained.

Before discussing the electrical circuit for the attainment of foregoing ends, it may be pointed out that the front panel also includes a counter 200, a primary power switch 52 to turn the device on and off, a test switch 53 and an indicator lamp 54. In addition a pair of test switches 55 and 56 are provided on each end of the panel 39 for the purpose of making certain tests on the apparatus to insure accuracy of the results.

Referring now to the circuit diagram shown in Fig. 3, the bars 27 with the holes 41 therein are shown in the upper left hand corner of the diagram and are denoted 27a to 27d for convenience. While only four such bars 27 are illustrated, it is apparent that the device may include any desired number. In addition certain of the openings 41 include contactors 51 as described in connection with Figs. 1 and 2. In the upper right hand corner of this diagram are three vertically disposed bars 18a, 18b and 18c which correspond to the bars 18 of the stock control panel 13. Although only three such bars are illustrated in the diagram it is apparent, of course, that any number of such bars may be employed.

The primary source of power for this device is obtained by means of a transformer 57 having primary 58 coupled with a pair of terminals 59 for attachment to a suitable power source. Application of energy to the primary 58 is controlled by the switch 52 and a suitable relay 52' having contact means connected in series with one side of the primary winding 58. The secondary 60 of the transformer is provided with terminals 61 and 62 and a center tap terminal 63. While in the present embodiment of the invention this secondary 60 is arranged to produce a total of approximately 12 volts, it will become apparent that any desired voltage may be employed providing the electrical components to be operated therefrom are modified accordingly. Energy is applied to the selector 33, represented herein by a single line, by means of a lead 64 from the center tap of the transformer 63, the arm 65 of a relay 66, the relay contact 67 and a lead 68. It is to be noted that this circuit is completed when the relay coil 69 of the relay 66 is deenergized by opening both of the switches 55 and 56 which connect the coil in parallel with the primary winding 58 of the transformer 57.

Assuming now that the bars 27a and 27c are energized by the selector 33, this will cause current to flow through the associated lamps 32 to a common bus 70 connected with a contact arm 71 of the relay 66. As this relay is deenergized the circuit is completed through the fixed contact 72, a connecting lead 73 to another fixed contact 74, thence through the contact arm 75 associated with the contact 74 and leads 76 and 77 to the transformer terminal 62. This will apply six volts to the first and third lamps 32 and illuminate them to indicate that those parts are needed for the particular item being checked.

In addition to the foregoing action a second circuit is completed which actuates certain of the relays 78 to 81 inclusive. In this particular case where bars 27a and 27c have been energized, a circuit is completed from the bar 27c through the lead 82 to the relay coil 79' of the relay 79, and leads 83, 84, 85 and 77 to the transformer terminal 62. This will actuate the relay 79 causing the movable contact 86 to complete a circuit through the fixed contact 87 and lead 88 to the bar 18b of the stock control panel 13. The lead 88 in this case is in effect the equivalent of one bar 19 and the associated contactor 20. If it is assumed that the bars 18a to c in Fig. 3 represent respectively quantities of 0, 10 and 20, then the stock item represented by the bar 27c has a stock quantity of 10. Simultaneously the energization of the program panel bar 27a completed a circuit through the lead 89 to coil 81' of relay 81 and then through leads 90, 84, 85 and 77 to the transformer terminal 62. This energized relay 81 and caused its movable contactor 91 to move upwardly to complete a circuit through its fixed contact 92 and lead 93 to the bar 18c denoting a quantity of 20.

The bars 18 are connected to the indicating means 12 at the top of the computer 10 as shown in Fig. 1 and it includes a plurality of relay coils 94, 97 and 100 and associated contact means 95—96, 98—99 and 101—102, respectively. Associated with the relays is a group of indicating lamps denoted by the numerals 120, 121, 122, etc. The lamp 120 is connected in parallel with the relay coil 94 and one side of the coil is connected to bar 18a. The other side of the coil is connected through lead 77 to the transformer terminal 62 and to the fixed contact 96. The second bar 18b is similarly interconnected with the relay coil 97 and the lamp 121 and these elements are connected to the contact 95 associated with the relay coil 94 and to its own contact 99. Similarly the third bar 18c is connected through the relay coil 100 and lamp 122 to the contact 98 associated with the relay coil 97 and to its own contact 102. This series may be continued for any number of bars 18.

It will now be observed that when energy was applied to the bars 27a and 27c the relays 79 and 81 were actuated which applied energy from the center tap 63 of the transformer through leads 64 and 106 and the respective relay contacts to the bars 18b and 18c representing the numerical quantities 10 and 20, respectively. Since energy was not applied to the first bar 18a, the associated relay contacts 95 and 96 remained closed and the circuit of relay 97 associated with bar 18b is completed through these contacts and lead 77 to the transformer terminal 62. This action illuminates lamp 121 and actuates the relay 97. Although energy is applied to the last bar 18c nothing will happen since the relay and lamp circuit associated with that bar is interrupted by opening of the contacts 98 and 99. Thus only lamp 121 will light on the indicator 12 to show that a maximum of 10 items can be fabricated since only 10 of the stock parts represented by the bar 27c are available.

While the bars 18 have been indicated as representing quantities of items in units of tens, it is quite apparent that any number of such bars may be employed and provide any desired type of indication in terms of units, tens, thousands, etc.

With the circuit thus far described the illustrated embodiment of the invention provides an indication of the maximum number of any given item that may be fabricated with existing parts. In the normal case only one part may be limiting the total number of items that can be fabricated and it may be that the next item having the least quantity in stock would prevent the fabrication of a desired quantity of such items. In order to provide this information simultaneously with the provision of information as to the least quantity of items that can be manufactured a plurality of lamps 121', 122', etc. are interconnected with the vertical bars 18 shown in Figs. 1 and 2. More specifically the first bar 18A which indicates a complete shortage of a given item will merely function when energized to cause its lamp 120 to become illuminated. The bar 18B representing a quantity of ten is provided with the lamp 121' connected between the bar and the lead 77 leading to the transformer 57. The bar 18C is provided with a similar lamp 122 connected between it and the lead 77. Thus, in the fabrication of a given item if one required part has no stock balance at all, the light 120 will light. If another stock part has a balance of ten, then upon energization of the bar 18B the light 121' will be illuminated along with the light 120 so that the operator will know that if thirty items are required he must not only procure the necessary number of the part that has been completely exhausted but he must also make up a shortage in another part which may have a stock balance below that required for the production of the 30 items.

In addition to the operating circuits described above, certain testing features are included in order to assure proper operation of the device. For this purpose a switch 53, lamp 54, relay 66 and switches 55 and 56 are employed. Considering first the test circuit involving the relay 66, let it be assumed that one of the switches 55 or 56 is closed to energize the coil 69. This will displace the movable contactors 65, 75 and 71 of this relay to the left as viewed in Fig. 3, and break the circuit which includes contact 67 to prevent the application of energy to the selector carriage 33. The movable contactor 75 breaks the circuit with its contact 74 and completes a circuit through the contact 74', lead 108 to one side of the lamp 54 thus connecting the lamp to transformer terminal 62. At the same time the contactor 71 completes a circuit from the common lead 70 of the lamps 32 through contact 72' and lead 109 to the transformer terminal 61. The other side of each of the lamps 32 is connected through its respective relay coil 78' to 81' and then through leads 84, 85 and 77 to the terminal 62 of the transformer. This action connects each lamp 32 in series with its relays 79 to 81 illuminating the lamp and actuating the relays. If all of the relays 78 through 81 function properly and operate to energize their respective strips 18 to which they may be connected, the lamp 54 which is interconnected with a common bus 110, interconnecting the normally closed relay contacts of each of the relays 78 to 81 will not be illuminated. Failure of any one of the relays to operate properly will cause the lamp 54 to become illuminated. In order to check the operability of the lamp 54, short circuiting switch 55 is connected between the lamp 54 and the lead 106 to apply energy directly to the lamp. With the foregoing procedure all of the lamps 32 are checked for operability simultaneously with each of their associated relays 78 through 81. While either switch 55 or 56 functions to effect this test, the two switches are employed on the ends of the panel 39 in order to avoid the necessity of always moving the selector 33 to one end in order to effect this test. With the two switches the selector need only be moved to the nearest of the two switches and thus facilitate testing.

While means have not been illustrated for testing the lamps and relays in the indicator 12, any suitable rotary selector switch may be employed to apply energy in sequence to the bars 18. To detect the failure of a lamp or relay such selector switch could be arranged to respond to the change in current in the circuit and indicate immediately the particular relay or lamp that has failed to operate.

Simultaneously with the computation of the least number of items that can be fabricated with a given inventory of component parts an automatic check is provided of both the accuracy of the computation as well as the insertion of the latest information pertaining to parts lists and other changes. Assuming, for instance, that the selector or carriage 33 failed in a given instance to contact one of the contacting members 51 on a bar 27 and that such bar represents a particular part in which there is no stock balance. In this situation a completely erroneous result would be obtained. In order to overcome this difficulty as well as to insure that changes in parts lists and requirements are properly inserted into the apparatus, an electrically operated counter 200 is provided along with a rotary selector switch 201. This switch has a rotary arm 202 that may be actuated by any conventional means such as the ratchet 203, pawl 204 and an electromagnetic coil 205. Associated with the contacting arm 202 are a plurality of contacts 206 each of which is connected with one of the bars 27. In the instant diagram only four contacts are shown as being connected to the four bars 27a through 27d inclusive and it is to be understood of course that sufficient contacts are provided so that there is one contact 206 for each of the bars 27. The contacting arm 202 is connected through a lead 207 to the electrically operated counter 200. The other terminal of the counter 200 is connected through a lead 208 to the lead 77 which returns to the transformer 57. The coil 205 of the step switch 201 is arranged to be energized from the transformer 57 or other suitable source of energy whenever the selector or carriage 33 is positioned in alignment with one of the divisions 40 on the item or model panel 39. Energization of this switch will cause the arm 202 to scan all of the contacts 206. Since only certain of these contacts will have been energized by reason of the application of energy to certain bars 27 by means of the selector 33, rotation of the arm 202 past these contacts will actuate the counter 200 to indicate the number of energized bars 27. This number is then the number of parts required for the fabrication of the selected item and must correspond with the number associated with each of the items in the selected division 40. Any deviation between them will indicate either faulty operation of the computer or failure to properly enter drawing changes on the program panel. In either case the difficulty can be quickly remedied and a correct result insured.

From the foregoing description it is apparent that this computing apparatus may be arranged to handle any desired number of stock parts, and of course any number of items, merely by increasing the length of the program panel bars 17 or the number of such bars. In addition, the stock record which is provided by the panel 13 and indicator 12 may be in terms of any units desired. By reason of the particular arrangement of the elements of the invention, duplicate panels may be coupled one to the other to accommodate a larger number of items in instances where it may be more convenient to utilize two computers side by side than to increase the size of a single computer.

Although only one embodiment of the invention has been illustrated, it is apparent that changes, alterations and modifications may be made without departing from the spirit and scope thereof.

What is claimed is:

1. Stock control apparatus comprising a stock control panel having a plurality of switching means each corresponding to an individual part and adjustable to indicate the quantity of such parts in stock, a program panel electrically connected with said stock control panel and having a series of positions thereon corresponding to items to be manufactured, selector means movable to any one of said series of positions to denote the parts required for the item corresponding to a selected position, and indicating means electrically connected with said stock control panel, said selector functioning upon movement to a given position to energize a predetermined group of switch means in said stock control panel corresponding to the parts required for said item and said indicating means responding to said energized switch means to indicate in terms of quantity the selected part having the least stock balance.

2. Stock control apparatus according to claim 1 wherein said program panel includes a plurality of lamps to visually indicate the specific parts required for a selected item.

3. Stock control apparatus according to claim 1 wherein said stock control panel comprises a plurality of parallel electrically conductive members connected with said indicating means and corresponding to different stock balances and a series of transversely positioned bars each corresponding to an individual part and carrying a movable contactor for connecting its associated bar with any one of said conductive members.

4. In stock control apparatus at least one set of parallel bars forming a program panel, means on said panel for energizing selected bars, a stock control panel including a series of parallel conducting members, transverse bars overlying said conducting members each having contact means for electrically connecting a transverse bar with one of said members, a relay including at least one set of contacts individual to and connected with each parallel bar and responsive to close said contacts upon energization of the last said parallel bar, connections between each of said sets of contacts and one of said transverse bars to energize said transverse bar upon actuation of the relays, indicating means coupled with said conductive members and responsive to the energization of at least one of said members and a counter including scanning means responsive to the energization of said parallel bars to indicate the number of said bars energized.

5. Stock control computing apparatus comprising a program panel, a plurality of electric circuits each including a relay having contacts thereon, means on said panel for energizing selected of said electric circuits corresponding to the parts required in the fabrication of a selected item of manufacture, a stock panel having a plurality of electrical contact devices each corresponding to an individual part, a second set of electric circuits, each corresponding to a selected stock balance, means on said stock panel for connecting certain of said contact devices to certain of the last said circuits to correspond to the number of each of said parts in stock, electrical connections between said relay contacts and said contact devices and indicating means connected with the last said second set of electrical circuits and responsive to the circuit representing the least stock balance whereby energization of certain of the first said circuits will complete certain of said second set of circuits through said stock panel to indicate the number of items that may be fabricated with existing stocks of parts.

6. Stock control computing apparatus according to claim 5 including a counter and means for scanning the first said circuits for indicating the number of the first said circuits energized for a selected item on said program panel.

7. In stock control apparatus, a plurality of parallel bars forming a program panel, means associated with said parallel bars for energizing selected bars, a series of parallel conducting members, transverse bars associated with said conducting members each including contact means for electrically connecting each transverse bar with one of said members, a relay including at least one set of contacts individual to each parallel bar and responsive to close said contacts upon energization of its associated parallel bar, connections between each set of contacts and one of said transverse bars whereby energization of a parallel bar will actuate its associated relay and energize the corresponding transverse bar together with the conductive member connected thereto, and indicating means responsive to the energization of said conductive members, said indicating means including a series of relays interconnected with said conductive members and each having an electromagnetic coil and at least one set of normally closed contacts, a lamp in parallel with each relay coil, connections between one side of each of said coils and one of its associated contacts, and connections between the other associated contact of each relay and said one contact of the next succeeding relay of the series, whereby energization of said conductive members applies energy between said one contact of the first relay in the series and the other side of one or more of said coils whereby only the energized relay nearest the start of the series and its associated lamp will be energized.

References Cited in the file of this patent

UNITED STATES PATENTS

| | | |
|---|---|---|
| 2,287,241 | Hallerberg | June 23, 1942 |
| 2,307,660 | Bascom | Jan. 5, 1943 |
| 2,407,176 | Piatt et al. | Sept. 3, 1946 |
| 2,437,018 | Dodson | Mar. 2, 1948 |
| 2,562,179 | Dorf | July 31, 1951 |
| 2,567,241 | Skillman et al. | Sept. 11, 1951 |
| 2,594,960 | May | Apr. 29, 1952 |
| 2,616,624 | Lake et al. | Nov. 4, 1952 |